United States Patent [19]

Goel et al.

[11] Patent Number: 4,766,196

[45] Date of Patent: Aug. 23, 1988

[54] ACCELERATORS FOR THE CURE OF EPOXY RESINS WITH AMINE CURING AGENTS

[75] Inventors: Anil B. Goel, Worthington; Teresa A. DeLong, Plain City, both of Ohio

[73] Assignee: Ashland Oil, Inc., Ashland, Ky.

[21] Appl. No.: 85,481

[22] Filed: Aug. 14, 1987

[51] Int. Cl.$^4$ ............................................. C08G 59/68
[52] U.S. Cl. ........................................ 528/89; 528/88; 528/91; 528/92; 528/361; 528/407; 528/120; 528/111; 502/167
[58] Field of Search ..................... 528/88, 89, 91, 92, 528/361, 407, 120, 111; 502/167

[56] References Cited

U.S. PATENT DOCUMENTS

| | | | |
|---|---|---|---|
| 3,720,634 | 3/1973 | Statton | 528/89 |
| 3,909,480 | 9/1975 | Ogata et al. | 528/91 X |
| 4,000,115 | 12/1976 | Jacobs | 528/89 X |
| 4,092,296 | 5/1978 | Skiff | 528/91 |
| 4,396,754 | 8/1983 | Brownscombe | 528/91 X |
| 4,600,763 | 7/1986 | Goel | 528/113 X |
| 4,668,758 | 5/1987 | Corley | 528/91 |

*Primary Examiner*—Earl Nielsen
*Attorney, Agent, or Firm*—John F. Jones

[57] ABSTRACT

A rapid curing epoxy resin composition comprising a mixture of (A) A first component comprising a polyepoxide and
(B) A second component comprising a mixture of the novel reaction product of
  (1) an ammonium salt of a non-nucleophilic acid with
  (2) the reaction product of
     (a) a bicyclic amide acetal with
     (b) an amine, and
  (3) an amine curing agent, is described.

20 Claims, No Drawings

ACCELERATORS FOR THE CURE OF EPOXY RESINS WITH AMINE CURING AGENTS

This invention relates to novel accelerators for the curing of epoxy resins with amine curing agents and more particularly pertains to the accelerators which are prepared by reaction of bicyclic amide acetals with alkylene polyamines and subsequent reaction with an ammonium salt of a non-nucleophilic acid such as ammonium tetrafluoroborate or ammonium hexafluorphosphate and to a process for rapid curing of epoxy resin-amine curing agent compositions by including such accelerators in these compositions.

A variety of aromatic and aliphatic polyamines (primary, secondary, mixed primary and secondary and combinations of these with tertiary amines) and amido amines therefrom, have been used extensively as curing agents for epoxy resins. In order to improve the cure speed of the polyamine/epoxy resin reactions, various types of cure accelerators including tertiary amino group containing materials; phenolics; quaternary ammonium salts of strong acids and carboxylic acids; metal salts of carboxylic acids; boron trifluoride-amine complexes and boron trifluoride-phenol complexes; mercaptans, thioether alcohols and thiocarbamic acids, have been used in the prior art. (See the article by Mika in "Epoxy Resins Chemistry and Technology," edited by May and Tanaka, Marcel Dekker, Inc., New York, 1973, and U.S. Pat. Nos. 8,265,664; 3,271,350; 3,291,776; 3,821,126; 3,637,591; 2,909,494; 4,554,342; 4,110,313; 4,195,153; 3,903,048; 3,642,649; 4,161,575; 3,660,354 and Japanese Patent No. 49092437.) Similarly, various types of curing catalysts for the homopolymerization of polyepoxide resins including metallic fluoroborate salts (U.S. Pat. No. 4,092,296), lithium and group II metal salts of non-nucleophilic acids (U.S. Pat. No. 4,396,754), Lewis acid/amine salts such as boron trifluoride-amine complexes (U.S. Pat. No. 2,717,285) and carbenium salts of non-nucleophilic acids (U.S. Pat. No. 4,565,837) have been disclosed.

Thus, it is quite apparent that the rapid curing of epoxy resins has been the subject of considerable industrial interest. Although the prior art cure accelerators improve the cure speed of epoxy resins cured with amine curing agents, these are often associated with some limitations. For instance, accelerators (such as mercaptans and thioethers) have unpleasant odors. Certain accelerators (such as boron trifluoride-amine complexes and boron trifluoride-phenol complexes) are corrosive and esters of phosphorus acid and metal carboxylates (such as stannous octoate) are moisture sensitive. Some of the prior art accelerators are not very efficient and promote acceleration only mildly. In addition to this, most prior art accelerators either copolymerize with epoxy resins (for instance, phenolics, mercaptans and thiocarbamic acids) or catalyze the homopolymerization of epoxy resins. Examples of such catalysts are tertiary amines, boron trifluoride-amine complexes and metal carboxylates.

It is an objective of this invention to provide rapid curing epoxy resin-amine curing agent compositions by means of a new class of cure accelerators which are free from the above-described limitations associated with the prior art accelerators and to provide rapid cure acceleration of the epoxy resin-amine curing agent compositions.

We have discovered that the reaction products of ammonium salts of non-nucleophilic acids with the reaction product of a bicyclic amide acetal and an alkylene polyamine act as excellent cure accelerators for epoxy resin-amine curing agent compositions.

The epoxy resins or polyepoxides useful in this invention can be monomeric or polymeric, saturated or unsaturated, aliphatic, cycloaliphatic, aromatic or heterocyclic, and they may be substituted if desired with other substituents besides the epoxy groups, e.g., hydroxyl groups, ether radicals, halogen atoms, and the like.

Typical epoxy resins suitable in the practice of this invention include those disclosed in U.S. Patent Nos. 2,500,600 and 2,324,483 which are incorporated herein by reference. Preferred in this invention are 1,2-epoxy compounds having an epoxide equivalence greater than 1, that is to say, compounds containing more than one group of the formula:

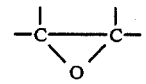

The 1,2-epoxide groups may be either terminal or inner ones. Particularly suitable terminal 1,2-epoxide groups are 1,2-epoxy ethyl or 1,2-epoxy propyl groups. The latter may be linked to an oxygen atoms, that is to say, they are glycidyl ether or glycidyl ester groups. Compounds with inner epoxide groups usually contain the 1,2-epoxide group in an aliphatic chain or in a cycloaliphatic ring.

As epoxy compounds containing an inner 1,2-epoxy group there are suitable epoxidized diolefins, dienes, or cyclic dienes, such as 1,2,5,6-diepoxy hexane, 1,2,4,5-diepoxy cyclohexane, dicyclopentadiene diepoxide, dipentene diepoxide, vinyl cyclohexene diepoxide, epoxidized diolefinically unsaturated carboxylic acid esters, such as methyl-9,10,12,13-diepoxy stearate or the dimethyl ester of 6,7,10,11-diepoxyhexadecane-1,16-dicarboxylic acid. Furthermore, there may be mentioned epoxidized mono-, di-, or polyesters, and mono-, di-, or polyacetals containing at least one cycloaliphatic 5-membered or 6-membered ring, to which at least two 1,2-epoxidized groups are linked.

A widely used class of polyepoxides which can be used in the present invention are the epoxy polyethers obtained by reacting a halogen containing epoxide or dihalohydrin such as epichlorohydrin, epibromohydrin, 3-chloro-1,2-epoxyoctane, and the like with either a polyhydric phenol or a polyhydric alcohol.

The bicyclic amide acetals useful in the practice of this invention are those of Formula I

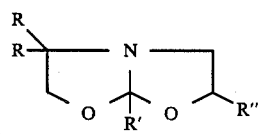

wherein R, R' and R" independently represent hydrogen, an alkyl group having from 1 to 20 carbon atoms, an alkyl ether group having from 1 to 20 carbon atoms, an aryl group having from 6 to 20 carbon atoms, an aryl ether group having from 6 to 20 carbon atoms or an alkaryl group having from 7 to 20 carbon atoms.

Thus, in accordance with the present invention, a two component, rapid curing epoxy composition is provided which exhibits rapid room temperature and low-to-moderately elevated temperatures (from room temperature to 150° C. or above) curing which composition is composed of a mixture of two essential components, namely, (A) at least one polyepoxide or epoxy resin as previously described and (B) a hardener component composed of a cure accelerator (catalyst) obtained by the reaction of (1) an ammonium salt of a non-nucleophilic acid having the formula $NH_4X$, wherein X represents $BF_4$, $BPh_4$, $PF_6$, $SbF_6$ or $AsF_6Y$ and wherein Ph represents a phenyl group ($C_6H_5$) with (2) the reaction product a (a) a bicyclic amide acetal of formula I and (b) an amine having the formula $H_2NCH(R''')(CH_2)_nNHY$ wherein R''' represents hydrogen or a methyl group, Y represents hydrogen or an alkyl group having from 1 to 20 carbon atoms or an ethylene amine group or a propylene amine group and n represents 1 or 2 and the reaction product of (1) an d(2) being mixed with (3) an amine curing agent which may be composed of di-, and polyamines (primary, secondary, tertiary amino group containing or mixed primary and secondary amines or these mixed with tertiary amino group containing compounds and/or amido amines obtained therefrom by reaction with carboxylic acids). The polyepoxide and polyamines can be combined in a variety of proportions depending on the type of products desired. In order to obtain the desired cure, it is generally preferred to combine the polyepoxide with at least 0.6 equivalent of polyamine per equivalent of epoxide. Equivalent amounts of polyamines include any available amino hydrogen. Preferably the polyepoxide and polyamine are combined in chemical equivalent ratios varying from 0.6:1 to 1.5 1 of amine to epoxide, respectively. The rapid curing epoxy resin compositions of this invention may also contain other modifiers, flexibilizers, additives such as phenolics, isocyanate prepolymers, surface active agents, diluents, fillers and pigments as would be within the skill of the art.

Representative amines of type (b) mentioned above include such di-, tri-, or polyamines as 1,3-propylene diamine, 1,2-diaminopropane, diethylene triamine, dipropylene triamine, triethylene tetramine and the like.

The amine curing agents of type (2) mentioned above include mono-, di-, or polyamines containing primary, secondary, mixed primary and secondary and combinations of these with tertiary amines and the amido amines obtainable from these amines by reaction with carboxylic acids. These amines and amido amines may also contain other functionalities such as ether groups, thioether groups, hydroxyl groups, urea and the like groups. Typical of such amines are butylamines, dodecylamines, cyclohexylamine, ethylene diamine, diethylene triamine, triethylene tetramine, tetraethylene pentamine and the like; propylene diamine, dipropylene triamine and the like, cyclohexane dimethyl diamine, triethyl amine, tributylamine, triethylene diamine, imidazolines, imidazoles, imidazines, hexamethylene diamine, isophorone diamine, aminoethylpiperazine, bis(aminopropyl) piperazine, piperidine, piperazine, morpholine, dimer acid diamine, xylylene diamine, alkanolamines such as ethanolamine, diethanolamine, N-alkyl alkanolamines, poly(alkylene ether)polyamines and polyamines of molecular weights up to 10,000. The useful amido amine curing agents include those obtained by the amidification reaction of polyalkylene diamines such as ethylene diamine, diethylene triamine, and the like with a carboxylic acid such as linoleic acid or other fatty acids or dimerized linoleic acid.

The accelerators of this invention, per se, show extremely poor reactivity towards the curing of epoxy resins; however, when they are mixed with commonly known amines and amido amine curing agents and are used for curing of epoxy resins, extremely rapid curing occurs at ambient temperatures as well as at low to moderately elevated temperatures (about 60 degrees to 150 degrees C.). The accelerators of this invention increase the rate of curing of epoxy resin-amine hardener compositions to such an extent that small amounts (from 0.2% to about 15% and preferably from about 0.5% to about 10% by weight of the combined hardener and epoxy resin components) of the accelerator is needed to reduce the cure time several fold. For instance, the reaction of a liquid diglycidyl ether of Bisphenol-A with aminoethylpiperazine (20% by weight of the total composition of amine) which requires approximately 50 minutes at room temperature to give a gelled product, when carried out in the presence of about 5% (by weight based on the total combined epoxy resin/amine composition) of the product of reaction of a bicyclic amide acetal/1,2-propylene diamine/ammonium tetrafluoroborate, the curing occurs within 6.5 minutes of mixing at room temperature (about 8 times faster reaction).

Other important features of the accelerators of this invention are their ability to promote the cure acceleration of epoxy resins cured with amine hardeners containing other conventional known cure accelerators such as phenolics, mercaptans, and the like.

The rapid curing epoxy resin compositions resulting from the combination of components (A) and (B) which optionally may contain other additives, modifiers, flexibilizers, fillers, and the like may be used in applications such as coatings, adhesives, reaction injection molding (RIM), reinforced plastics, composites, potting and tooling compounds, injection molding, sheet molding compounds (SMC) and the like as would be apparent to those skilled in the art.

The accelerators of this invention may be dissolved or dispersed in the amine hardener component and if desired, may be encapsulated in either a thermoplastic material or by reacting with reactive molecules such as isocyanate, epoxide and other techniques known in the prior art.

This invention is further illustrated in the following representative examples.

EXAMPLE 1

A cure accelerator was prepared in accordance with this invention by heating a solution of 13 g of a bicyclic amide acetal of formula I (wherein R and R'' represent hydrogen and R' represents a methyl group) and 7.4 g of 1,2-diaminopropane at 100 degrees C. for 30 minutes followed by heating the resulting mixture with 10.5 g of ammonium tetrafluoroborate at 110 degrees C. for 30 minutes. Vigorous ammonia gas evolution was observed during the heating period. The resulting liquid was degassed under reduced pressure to remove the residual ammonia. The resulting product was used as cure accelerator (designated as accelerator "I") for the curing of epoxy resin-amine hardener mixtures to give rapid setting epoxy resin compositions. Typically, 0.5 g of this accelerator was mixed with 2.5 g of aminoethylpiperazine to give the hardener component which was found when mixed with 12 g of the diglylcidyl ether of Bisphenol-A (DGEBPA, molecular weight 180 to 195) to gel at room temperature in 6.5 minutes.

EXAMPLE 2

This example which is for comparative purposes and is outside the scope of the present invention demonstrates that the hardener of Example 1 without the catalyst of this invention cures the epoxy resin at a much slower speed. The diglylcidyl ether of Bisphenol-A (12 g) was mixed with 3 g of aminoethylpiperazine at room temperature. The reaction mixture was found to gel at room temperature in about 50 minutes. In another experiment, 12 g of DGEBPA was mixed with 2.5 g of aminoethylpiperazine and 0.5 g of the bicyclic amide acetal of Example 1. The room temperature curing time for the resulting mixture was found to be 52 minutes. In another experiment, 12 g of DGEBPA was mixed with a hardener obtained by mixing 2.5 g of aminoethylpiperazine and 0.5 g of diaminopropane. The gel time of the resulting mixture was found to be 55 minutes at room temperature.

EXAMPLE 3

The procedure of Example 1 was followed using 13 g of the bicyclic amide acetal and 10.3 g of diethylene triamine to give a viscous liquid reaction product. To this liquid was added 10.5 g of powdered ammonium tetrafluoroborate and it was then heated at 110 degrees C. for 30 minutes during which time ammonia gas evolution was observed. The resulting product was degassed to give another cure accelerator designated as accelerator "II". A 15.2 g portion of this cure accelerator was mixed with 4.7 g of additional ammonium tetrafluoroborate and was heated at 110 degrees C. for 35 minutes under constant stirring. Further ammonia evolution occurred and the resulting product (brownish red colored) was degassed to give a new cure accelerator designated as accelerator "III".

EXAMPLES 4-27

Several epoxy resin-amine curing agent-accelerator mixtures were prepared and the ingredients used, cure conditions used and results obtained are given in the following Table. Examples 5, 7, 11, 13 and 15 are given in the Table for comparative purposes and are otherwise outside the scope of the present invention.

TABLE

| Example # | Epoxy Composition | | | Temperature (°C.) | Gel Time (Min.) |
|---|---|---|---|---|---|
| | Epoxy Resin(g) | Amine(g) | Catalyst(g) | | |
| 4 | DGEBPA (12) | DETA (2.5) | I (0.5) | RT | 11 |
| 5 | (12) | DETA (3.0) | None | RT | 45 |
| 6 | (12) | TETA (2.5) | I (0.5) | RT | 11 |
| 7 | (12) | TETA (3.0) | None | RT | 69 |
| 8 | (12) | 1,2 DAP (2.5) | I (0.5) | RT | 14.5 |
| 9 | (12) | TREN (2.5) | I (0.5) | RT | 10 |
| 10 | (10) | T403 (4) | I (0.5) | 115° C. | 3.2 |
| 11 | (10) | T403 (4) | None | 115° C. | 8 |
| 12 | (10) | D400(3) + AEP(1) | I (0.5) | 115° C. | 2 |
| 13 | (10) | D400(3) + AEP(1) | None | 115° C. | 4 |
| 14 | (10) | D400(2) + AEP(1) + BPA(1) | I (0.5) | 115° C. | 1.4 |
| 15 | (12) | TREN (2.5) | None | RT | 70 |
| 16 | (12) | AEP (2.5) | II (0.5) | RT | 6.5 |
| 17 | (12) | DETA (2.5) | II (0.5) | RT | 12 |
| 18 | (12) | TETA (2.5) | II (0.5) | RT | 13 |
| 19 | (12) | EDA (2.5) | II (0.5) | RT | 12 |
| 20 | (12) | TREN (2.5) | II (0.5) | RT | 12 |
| 21 | (10) | T403 (4) | II (0.5) | 122° C. | 3.3 |
| 22 | (10) | D400(3) + AEP(1) | II (0.5) | 122° C. | 2 |
| 23 | (10) | D400(2) + AEP(1) + BPA(1) | II (0.6) | 122° C. | 1.3 |
| 24 | (12) | AEP (2.5) | III (0.5) | RT | 5 |
| 25 | (12) | TETA (2.5) | III (0.5) | RT | 9 |
| 26 | (10) | D400(3) + AEP(1) | III (0.5) | 122° C. | 1.75 |
| 27 | (10) | AA(3) + AEP(1) | I (0.5) | RT | 20 |

DGEBPA = liquid diglycidyl ether of Bisphenol-A (epoxy equivalent weight of approximately 180 to 195)
AEP = amino ethyl piperazine
EDA = ethylene diamine
DETA = diethylene triamine
TETA = triethylene tetramine
1,2 DAP = 1,2 diamino propane
TREN = tris(aminoethyl)amine
T403 = poly(oxypropylene) triamine (molecular weight approximately 400)
D400 = poly(oxypropylene) diamine (molecular weight approximately 400)
BPA = Bisphenol-A
AA = Amido amine obtained by the amidation reaction of linoleic acid with diethylene triamine
I = cure acceleartor of Example 1
II = cure accelerator of Example 3
III = cure accelerator of Example 3 having higher amounts of tetrafluoroborate
RT = room temperature 1. A rapid curing epoxy resin composition comprising a mixture of
   (a) a first component comprising a polyepoxide, and
   (b) a second component comprising a mixture of thereaction product of
      (1) an ammonium salt of a non-nucleophilic acid with
      (2) the reaction product of
         (a) a bicyclic amide acetal with
         (b) an amine, and
      (3) an amine curing agent.
2. The composition of claim 1 wherein the polyepoxide is a compound containing more than one group of the formula

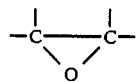

3. The composition of claim 2 wherein the non-nucleophilic acid has the formula $NH_4X$ wherein X represents $BF_4$, $BPh_4$, $PF_6$, $SbF_6$ or $AsF_6$ and wherein Ph represents a phenyl group ($C_6H_5$)

4. The composition of claim 3 wherein the bicyclic amide acetal is one having the formula

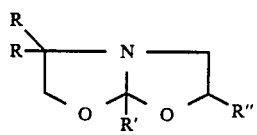

wherein R, R' and R" independently represent hydrogen, an alkyl group having from 1 to 20 carbon atoms, an alkyl ether group having from 1 to 20 carbon atoms, an aryl group having from 6 to 20 carbon atoms, an aryl ether group having from 6 to 20 carbon atoms or an alkaryl group having from 7 to 20 carbon atoms.

5. The composition of claim 4 wherein the amine [(2)(b)] is one having the formula $H_2NCH(R''')(CH_2)_nNHY$ wherein R''' represents hydrogen or a methyl group, Y represents hydrogen, an alkyl group having from 1 to 20 carbon atoms, and ethylene amine group or a propylene amine group and n represents 1 or 2.

6. The composition of claim 5 wherein the amine curing agent [(3)] is selected from the group consisting of butylamines, dodecyl amines, cyclohexyl amine, ethylene diamine, diethylene triamine, triethylene tetramine, tetraethylene pentamine, propylene diamine, dipropylene triamine, cyclohexane dimethyl diamine, triethyl amine, tributyl amine, triethylene diamine, imidazolines, imidazoles, imidazines, hexamethylene diamine, isophorone diamine, aminoethyl piperazine, bis(aminopropyl) piperazine, piperidine, morpholine, dimer acid diamine, xylylene diamine, ethanolamine, diethanol amine, N-alkyl alkanolamines, poly(alkylene ether) polyamines of molecular weight up to 10,000, and amido amines formed by the reaction of polyalkylene amines with a carboxylic acid.

7. The composition of claim 6 wherein there is present from 0.2% to about 15% by weight of the reaction product [(1) and (2)].

8. The composition of claim 7 wherein there is present from 0.6:1 to 1.5:1 equivalents of polyepoxide:amine curing agent [(3)].

9. The composition of claim 8 wherein the polyepoxide is the diglycidyl ether of Bisphenol-A and the bicyclic amide acetal is one in which R and R" represent hydrogen and R' represents a methyl group.

10. The composition of claim 9 wherein the amine [(2)(b)] is 1,2-diamino propane.

11. The composition of claim 9 wherein the amine [(2)(b)] is diethylene triamine.

12. The composition of claim 10 wherein the amine curing agent [(3)] is aminoethylpiperazine.

13. The composition of claim 10 wherein the amine curing agent [(3)] is diethylene tetramine.

14. The composition of claim 10 wherein the amine curing agent [(3)] is triethylene tetramine.

15. The composition of claim 10 wherein the amine curing agent [(3)] is 1,2-diamino propane.

16. The composition of claim 10 wherein the amine curing agent [(3)] is tris(aminoethyl) amine.

17. The composition of claim 10 wherein the amine curing agent [(3)] is poly(oxypropylene) diamine.

18. The composition of claim 11 wherein the amine curing agent [(3)] is diethylene triamine.

19. The composition of claim 11 wherein the amine curing agent [(3)] is ethylene diamine.

20. An accelerator composition comprising the reaction product of (1) the ammonium salt of a non-nucleophilic acid with (2) the reaction product of (a) a bicyclic amide acetal with (b) an amine.

* * * * *